United States Patent [19]

Biggio

[11] Patent Number: 4,995,772
[45] Date of Patent: Feb. 26, 1991

[54] SELF LOADING AND UNLOADING PRE-CAST CONCRETE HAULING UNIT

[76] Inventor: Richard R. Biggio, Rte. 1, Box 30, 756 River Rd., Lindley, N.Y. 14858

[21] Appl. No.: 437,264

[22] Filed: Nov. 16, 1989

[51] Int. Cl.⁵ .............................................. B60P 3/00
[52] U.S. Cl. .................... 414/458; 414/495; 280/790
[58] Field of Search ............... 414/495, 458, 10, 11; 280/790, 791, 792, 415.1

[56] References Cited

U.S. PATENT DOCUMENTS

| | | | |
|---|---|---|---|
| 3,786,951 | 1/1974 | Ruff | 414/495 |
| 3,967,743 | 7/1976 | Yoder | 414/495 X |
| 4,061,353 | 12/1977 | Kingman | 414/495 X |
| 4,221,530 | 9/1980 | Williams | 414/674 X |
| 4,455,115 | 6/1984 | Alger | 414/21 |
| 4,491,449 | 1/1985 | Hawkins | 414/495 X |
| 4,511,303 | 4/1985 | O'Neill | 414/458 |
| 4,792,272 | 12/1988 | Oswald | 414/458 |

FOREIGN PATENT DOCUMENTS

665992 9/1929 France ........................... 280/790

Primary Examiner—Robert P. Olszewski
Assistant Examiner—Craig Slavin
Attorney, Agent, or Firm—Daniel K. Dorsey

[57] ABSTRACT

A computer automated hydraulic hauling unit for transporting precast concrete bridge segments from a casting site to an erection site. The apparatus includes a transportable chassis having computer controlled hydraulic members with means to elevate precast bridge segments from casting forms. The operator sets the lifting and transport parameters in the computer controller from the control panel for elevation and lift control. Each segment is rolled into place on a trailer bed and through automated electronic circuits the hydraulic cylinders apply force to raise the segments onto a movable and uniform beam structure. After elevation to a preselected height each segment is anchored by means of pinning vertical interlocking beams made of high strength structural steel. This computerized hydraulic beam trailer can accommodate one or two segments per load. This apparatus provides construction companies with a safe, automated method to transport precast segments by a self-loading and unloading mechanism that eliminates expensive extra hauling operations.

26 Claims, 7 Drawing Sheets

SELF LOADING AND UNLOADING PRE-CAST CONCRETE HAULING UNIT

BACKGROUND OF THE INVENTION

1. Field of the Invention

This invention pertains to construction hauling equipment, and more particularly to an apparatus and method for transporting concrete cast bridge segments from the casting site to the bridge erection site.

2. Description of the Prior Art

Various equipment has been developed to transfer materials and articles between locations having different vertical and horizontal positions. For example, U.S. Pat. No. 3,103,291 shows a vehicle useful for loading and unloading airplanes, and U.S. Pat. No. 3,446,379 shows a scissors type high lift elevating mechanism. U.S. Pat. No. 4,162,873 discloses an extensible boom lift which includes a table mounted on a scissors-type lifting device and supporting a beam which is rotatable about a vertical axis. An extensible boom is supported by the rotatable beam.

The handling of precast concrete bridge segments at bridge construction sites has always presented difficult problems. The common practice is to erect two stationary cranes at great expense; the first crane is used to load the concrete segments from the casting site onto transport vehicles and the second crane is used at the construction site to unload the vehicles and mount the segments in place.

From the teachings of the existing art, there is no provision for transporting and erecting a precast concrete segmented bridge without the use of two cranes in addition to transport vehicles.

Thus a need exists for a single vehicle which will replace the function of the expensive stationary cranes at both the casting site and the bridge construction site and which will additionally perform as the transport vehicle between the two sites. Such a vehicle would have the lifting and mounting characteristics of a crane type vehicle as well as the stabilizing load characteristics of the transport vehicle. This vehicle would also be computer automated for efficient, accurate, and inexpensive operation.

In addition to the prior difficult problems of erecting precast bridge segments, there have also been difficulties in determining the weight of concrete segments during construction in order to prevent crane collapse or structure failure.

From the teachings of the existing prior art, there is no provision for weighing or accurately measuring the mass of the concrete segment during erection. Thus a need exists for a single vehicle which will function both as a crane type vehicle as well as provide a computerized digital read out of the weight of each concrete segment so that the operator who knows the design capacity of the structure under construction will not exceed this capacity by adding a concrete segment whose weight will cause the entire structure to fail.

SUMMARY OF THE INVENTION

It is an object of the present invention to provide a computer automated vehicle for transporting loads, particularly precast concrete bridge segments, said vehicle is economical to manufacture and maintain and repair as well as simple in its construction, is reliable and safe in its operation and may be controlled by a single operator.

These objects are achieved to a great extent by providing a vehicle, either a trailer or a self-propelled vehicle with two longitudinal lattice beams and tailgate which together provide the main strength of the vehicle as well as the support for the hydraulic lifting system and vertical locking system. The hydraulic lifting system is comprised of a series of four hydraulic cylinders embodied vertically in the lattice beams which when extended apply force to a separate beam that vertically lifts the load.

Comparably the vertical locking system is adjacent to the hydraulic lifting system and is comprised of intersliding rectangular steel beams to provide telescopic action wherein the innermost beam is attached to the load lifting beam and can be held stationary at a desired height by inserting a steel pin that protrudes through the walls of the intersliding beams.

In addition to the hydraulic lifting system and the vertical locking system, the vehicle has a tailgate comprised of two structural steel doors each hinged on the two longitudinal lattice beams which abut each other when closed at the center of the vehicle. The gate closure locking mechanism is hydraulic which when engaged joins the doors of the tailgate providing internal strength to the longitudinal lattice beam chassis. Hydraulic power is supplied to the longitudinal lattice beam by a motor and pump unit mounted on the vehicle with multiple controls located conveniently adjacent to each hydraulic member.

The vehicle systems, namely the hydraulic lifting system, the vertical locking system and the tailgate assembly, are automated through computer control. The operator inputs set points at the control panel to control the hydraulic lifting system to raise the precast bridge segment off its pallet and then to lower the concrete bridge segment. The operator then inputs set points at the control panel to control the vertical locking system to stabilize and immobilize the concrete bridge segment for transport. Finally the operator inputs set points to automatically control the hydraulics and locking mechanism of the tailgate assembly.

DETAILED DESCRIPTION OF THE FIGURES

DETAILED DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

The features of the present invention may be used with a self-propelled vehicle, that is a vehicle having a driver's cab, engine, transmission, drive train and steerable wheels, or it may be used in a trailer. For the purpose of illustration, a preferred embodiment is illustrated in the drawings as a trailer shown in FIG. 1.

The prestressed concrete bridge segment hauling unit 10 comprises a chassis 20 which is adapted for over the road travel by the use of conventional wheel and axle assemblies 30. The chassis 20 is attachable to and transportable by a tractor 70 through a standard hitch mechanism.

Built onto the chassis 20 is a motor and a pump unit 90 which generates power for cylinders or RAMS 40(a), 40(b), 40(c) and 40(d) to raise and lower the concrete bridge segment. It will be noted that reference hereinafter to elements (c) and (d) not shown in the drawings are considered to be similar to elements (a) and (b) as shown in the drawings. Also built onto the chassis 20 are stabilizing cylinders 80 and tailgate locking cylinders 100 (see FIG. 3). The hydraulic controls for operating this system, as well be hereinafter described are preferably located within a station 110, 120 (FIG. 1) and 130 (FIG. 3) common to the member that they will control, which provides safe efficient as well as balanced operation.

CHASSIS

Figures 1, 2:
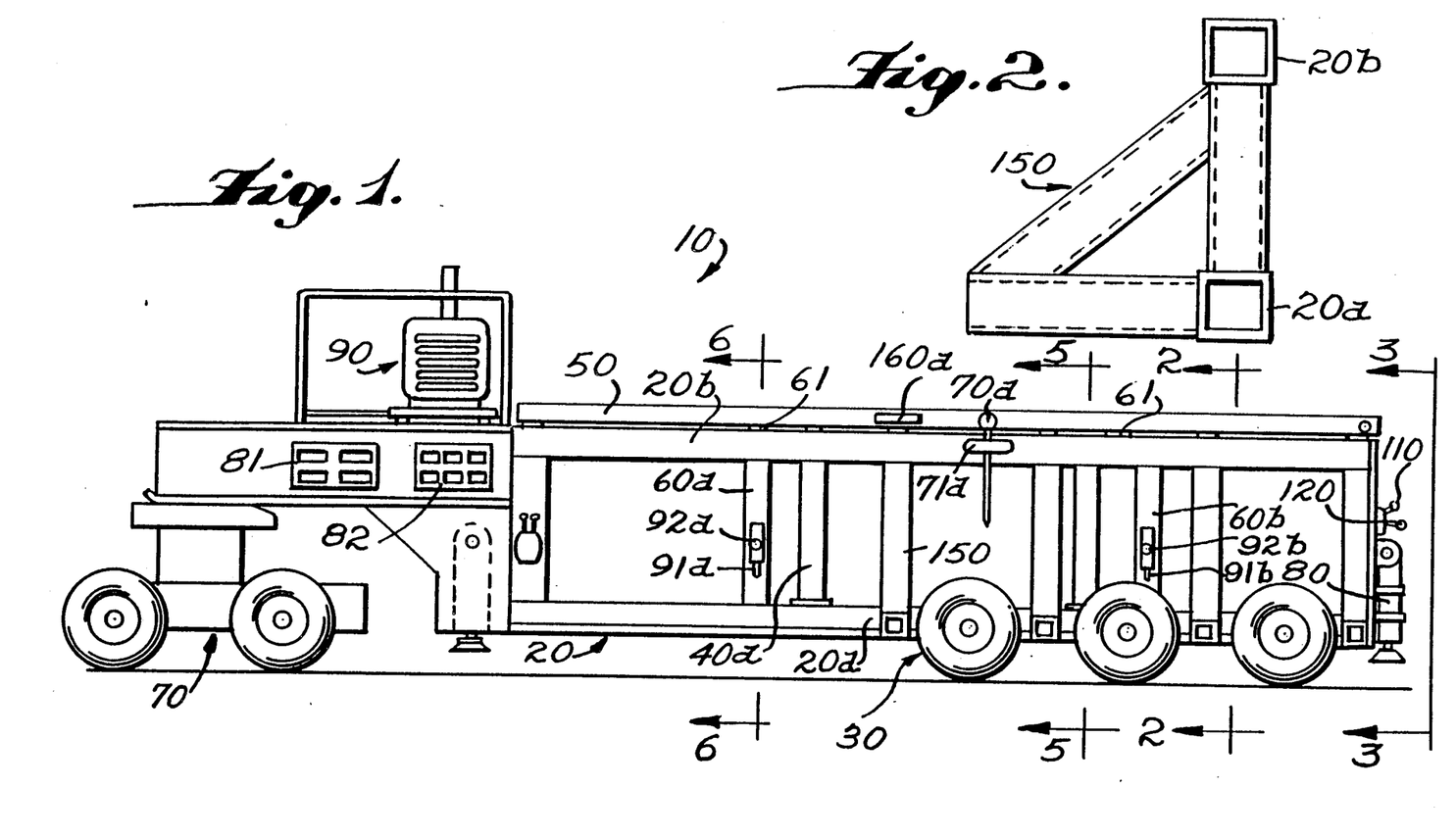
FIG. 1 is a side elevation view of a preferred embodiment of a vehicle illustrating the features of the present invention.
FIG. 2 is a cross sectional view taken along line II—II of FIG. 1.

FIG. 1 shows chassis 20 built of structural steel beams forming the two longitudinal lattice beams of a size and configuration sufficient to lift the designed load. Embodied in this chassis are four hydraulic cylinders or Rams 40(a), 40(b), 40(c) and 40(d) shown in FIG. 1 which can be clearly seen in FIG. 5 to be supported by a lower chassis member or lower chord 20(a) and laterally supported by chassis member or upper chord 20(b). When the cylinders are actuated by their control 140 in FIG. 1, hydraulic RAMs 40(a), 40(b), 40(c), and 40(d) are forced vertically up or down depending on the control position. The RAMs in conjunction with the control apply the force necessary to move the lifting beams 50 (See FIGS. 1 and 3) which supports the load. To provide a margin of safety while in transport, the vertical force of the load caused by gravity will be restricted by four vertical locking devices 60(a), 60(b), 60(c), and 60 (d) shown in FIG. 1.

Embodied in the longitudinal lattice beams of the chassis 20(a), 20(b), 20(c), and 20(d) as shown in FIGS. 1 and 2, are rotational braces 150. FIG. 2 shows three structural steel members that compose this stationary bracing system. The purpose of the rotational brace is to negate the rotational force on the lower cord 20A (FIGS. 1 and 2) imposed by the wheel and axle assemblies that are affixed directly to the lower chords 20A.

TAILGATE AND HITCH SYSTEM

Figure 3:
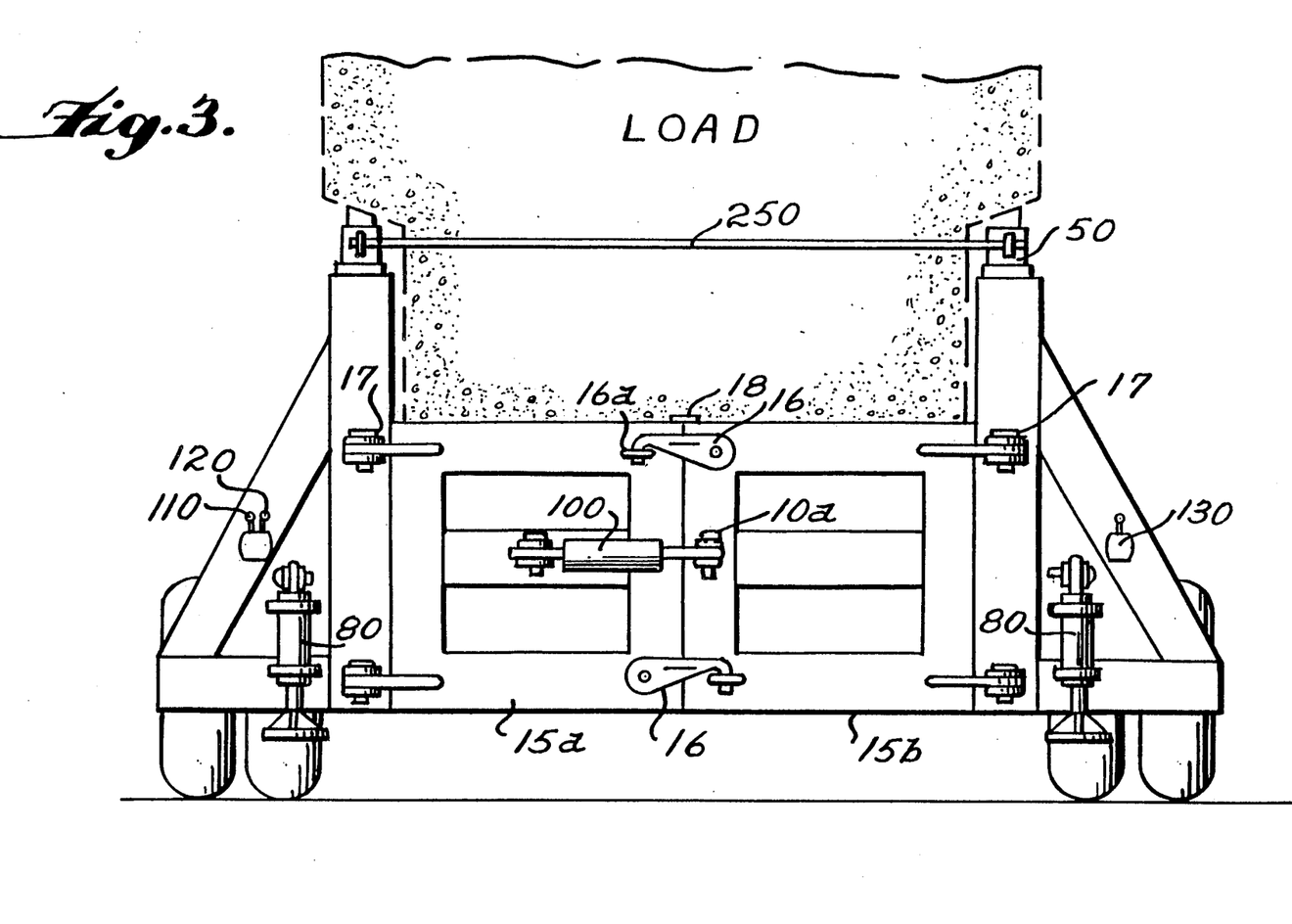
FIG. 3 is a rear sectional view of a preferred embodiment of a vehicle illustrating the features of the present invention taken along line III—III of FIG. 1.

The hitch is a structural extension of the main chassis consisting of a ball and metal hinge for pivoting members. The hitch is a common well known connection between a tractor and trailer. FIG. 3 shows a general elevation view of the tailgate assembly which includes two doors left (15A) and right (15B), and these doors are attached to hinges 17 on which these doors swing. Additionally attached to the doors is the hydraulic cylinder 100 that firmly closes the doors. The pressure in the hydraulic cylinder is set by the computer panel generally indicated by numeral 81 at the control panel and then adjusted through an analog circuit with a feed back loop to a microprocessor to insure that the pressure has been properly achieved Alternatively under manual control, the hydraulic control or lever (120) is actuated to cause the hydraulic cylinder (100) to pull together the tailgate doors left (15A) and right (15B) thus causing any pressure on mechanical locks 16 located on the upper and lower portions of the tailgate doors to be released. The operator then rotates the locks out of their respective eyes 16A. Then the operator actuates the hydraulic control lever (120) to cause the hydraulic cylinder 100 to release the binding force pin 10A such that pin 10A may be pulled out of the assembly to separate the tailgate into two freely swinging doors on four massive hinges 17. At this time the doors 15A and 15B are then swung shut and the hydraulic control lever is actuated either manually or through computer control to cause cylinder 100 to move such that pin 10A may be replaced. Then mechanical locks 16 are rotated into eyes 16(a) and if they don't engage then lever 120 is actuated so that hydraulic cylinder 100 forcibly pulls the doors 15A and 15B together which will cause locks 16 to engage the eyes 16(a) thus locking the tailgate under load. A safety bar 250 extends across the tailgate assembly connected to the beams 50. Bar 250 is attached for safety reasons and could be any other type of device to serve this purpose, such as a chain.

HYDRAULIC LIFTING SYSTEM

The hydraulic cylinders used to apply the forces necessary for lifting and lowering the concrete segments are embodied within the longitudinal lattice beam framework (20 of FIG. 1) of the segment hauling unit. Each of the hydraulic Rams has its cylinder bearing surface mounted parallel to reduce side thrust (See 40(a), 40(b), 40(c), and 40(d) in FIGS. 1 and 5). The base of the cylinders are mounted in a pocket that is affixed to the lower chord 20(a) in FIG. 5 and the top of the cylinder is cradled in a pocket fabricated into upper chord 20(b) in FIG. 5. The bearing end of the Ram is attached to the lifting beam 50 in FIG. 5 by a bolt.

Figure 4:
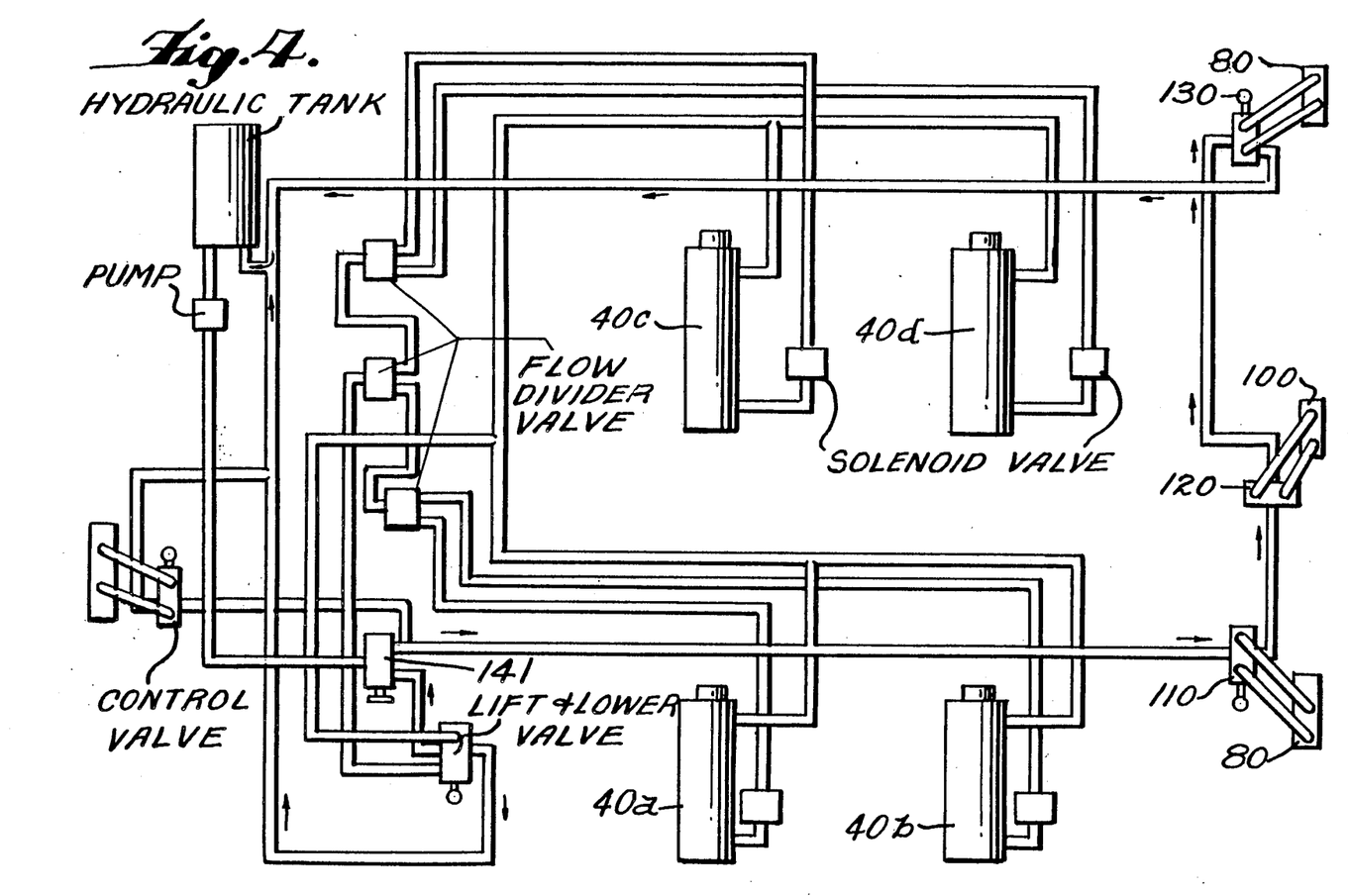
FIG. 4 is a schematic and block diagram of the hydraulic system of the invention.

Each of the cylinders 40(a), 40(b), 40(c), and 40(d) are equipped with raising and lowering ports (see FIG. 5) which are plumbed to the motor and pump unit 90 in FIG. 1 through a singular control 140 in FIG. 1. The hydraulic jacking control system employs equal force to move each of the hydraulic Rams. That is the system maintains equal pressure and thus equal force on each jack. This system ensures that no twisting force is transmitted to the concrete load or bridge segment being hauled FIG. 4 shows the hydraulic plumbing schematic which depicts the flow of oil from the reservoir tank where it is pressurized by the high pressure hydraulic pump to the divider valve 141 in FIG. 1 which splits the system into two main parts: part 1 being raising or lowering the load and part 2 being stabilizing the trailer and locking the tailgate. Operations of part 1 are separate from those of part 2 and the divider valve provides a margin of safety against part 1 operations accidentally being employed while part 2 operations are active and vice versa. Activating the directional valve to energize part 1 circuit pressurizes the lift and lower valve which is electrically controlled by a solenoid and is capable of being controlled manually if necessary. The relative position of this valve directs the flow of hydraulic fluid to ports on the hydraulic cylinders that cause lift in the direction of the valve position. In line at each of the lifting and lowering cylinders is an electrically controlled solenoid valve that is controlled by the control panel via sensors and can regulate the flow to that cylinder thus creating a lifting system controlled by parameters programmed into the control panel and monitored by electronic sensors. When the directional valve energizes part 2 of the system, the flow pressurizes the 3 stabilizing cylinders 80 and the tailgate locking cylinder 100.

COMPUTER CONTROL

Figures 5, 6, 7:
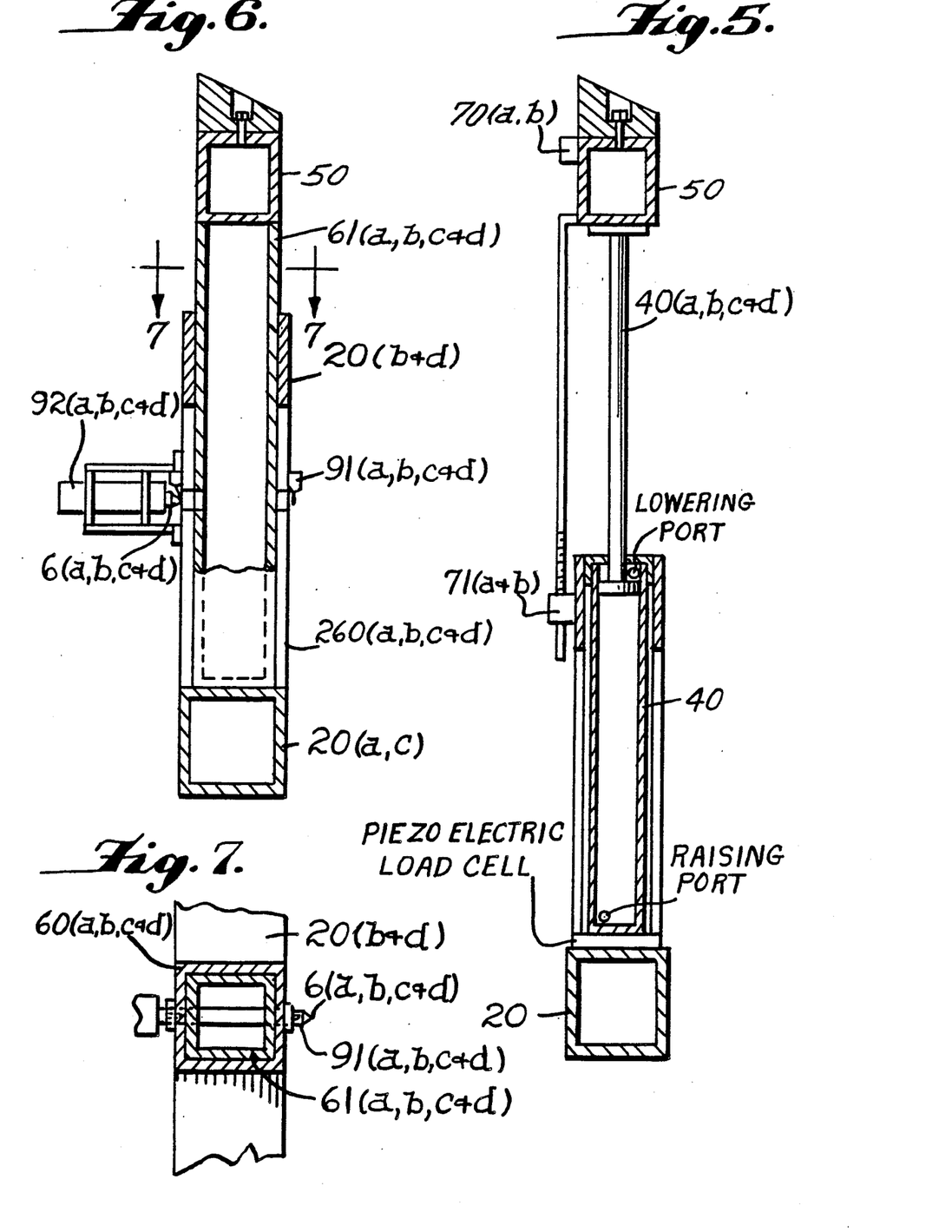
FIG. 5 is a cross sectional view taken along line V—V of FIG. 1.
FIG. 6 is a cross sectional view taken along line VI—VI of FIG. 1.
FIG. 7 is a partial cross sectional view taken along line VII—VII of FIG. 6.
Figure 8:
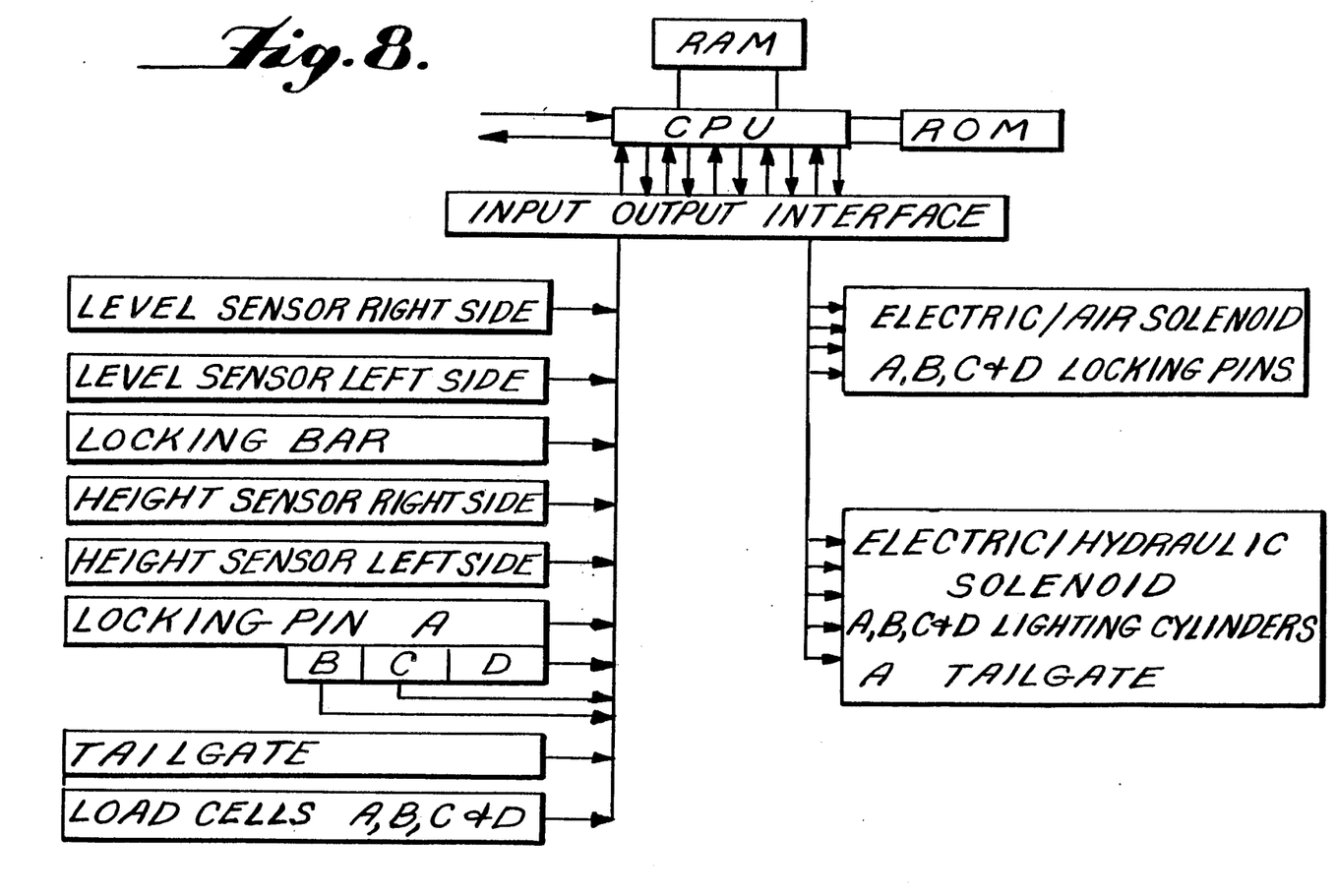
FIG. 8 is a block and circuit diagram of the computer control circuitry for automating the invention.

The concrete bridge segment hauling unit is automated through a computer controlled control panel 81 with set point control and digital read out for each of the critical variables needed to control the lifting and transport concrete bridge segments (See FIG. 8). The control panel consists of one digital read out display composed of conventional LEDs as well as a numeric keypad with letter designations for the particular critical transport variable which is to be read out and displayed. The transport variables measured are the height of the bridge segment from its center of gravity, the slope or longitudinal planar level, the cross slope or transverse planar level, the tailgate closure, and the lockpin insertion for secure transport of the 40 ton segment weight, and finally exact segment weight readout. Each height and planar level variable is measured through sensors (70A and B and 71A and B) which are placed on the trailer bed as shown in FIGS. 1 and 5. The tailgate closure variables are measured through additional magnetic micro switch sensor (18) as shown additionally in FIG. 3.

The operator sequentially moves through the series of operation steps as described below and reads the digital display screen to see that each of the variables have been satisfactorily achieved the appropriate set point as previously set by the operator. A feed back loop with alarm limits prohibits the operator from moving the bridge segment until each of the transport variables has achieved the setting as preprogrammed in the computer.

Each of the critical transport variables is controlled through the computer control panel (81) FIG. 1 after a set point is input by the computer activating a dc voltage output line whereby the magnitude of the voltage on that line is directly related to the magnitude of the setpoint input for the critical variable. The DC output voltage is input to the solenoid controls (82) which in turn controls the hydraulics on the various points on the trailer bed as shown in FIG. 1. There are four sets of hydraulics on the trailer bed a shown namely the bed raising hydraulics, the transverse control level hydraulics, the longitudinal control hydraulics, and the tailgate hydraulics. Each hydraulic when actuated by the solenoid control which pressurized and move the bridge segment bed in the controlled direction of the hydraulic's mounting. This movement will continue until the set point is reached. The computer determines that the set point has been reached by comparing the set point's voltage input to the solenoid with the detected output voltage of each sensor which is returned to the computer control panel from the appropriate sensors. When the two voltages reach an acceptable comparison range the computer stops outputing dc voltage to the hydraulics and the system is stabilized.

The precast concrete bridge segment hauling unit will incorporate the use of well known digital electronic sensors and circuitry to provide an easy and accurate means by which the operator can control and monitor the mechanical functions of the trailer. This system will contain a main control panel with digital readouts and a programmable key pad, combination slope-cross slope sensors, laser optical sensors for vertical control, optical sensors to monitor mechanical functions such as spud pins, tailgate position, and to provide signals for comparator circuitry to effect switching functions.

The control panel (81) of FIG. 1 and 8 is conveniently located for safe operation. Electrical power for the control panel is supplied by battery which is charged by a motorized hydraulic pump unit. Slope and cross slope sensors are mounted on the lifting beam both on the right and left . . . trailer 160 A and B of FIG. 1 and 5 and positioned at the center of the trailer 160A of FIG. 1. The function of these sensors is to constantly measure both longitudinal and transverse slope and signal the control panel (81) of FIG. 1. The incoming signals from these sensors are compared through a comparator circuit with the set point at the control panel. The differential in the comparison results in a corresponding differential in an outgoing voltage signal which triggers the flow of fluid to the load cylinders of FIG. 1. These load cylinders then raise or lower the bed via the hydraulics to maintain the preset slope parameters.

Optical laser sensors 71A-71B are located close to the center of the trailer on the top chord (see FIG. 1 and 5) on both the left and right sides of the trailer. These sensors read a barcode linear scale on shafts 70A and 70B which are mounted on the lifting beam and which vertically project through the laser sensors (71A and 71B) These sensors read the exact height of the lifting beam and send signals to control panel 81 of FIG. 1 which is preprogrammed to compare these signals with the preprogrammed set point signals and then to send out voltage level control signals through a solenoid to maintain the level parameter at the preestablished set point height. The signals engage air actuated solenoids located on bank 82 Which in turn actuate air cylinders 92 A,B,C, of FIGS. 1 and 6 which engage and disengage the spud pins. Sets of micro switch roller cams 91 A,B,C,D of FIGS. 1,6, and 7 indicate the position of the pins and signal the control of the presence or absence of the locking spud pins thus prompting the operator to act accordingly.

An additional feature of this segment hauling unit is the unique ability to calculate and measure accurately the weight of the transported load. This is accomplished by using a pizoelectric load cell to measure the pressure exerted on each hydraulic cylinder ram cross section and then by converting the resulting pressure to a voltage output signal. (See FIG. 5) The voltage output signal is then converted at the control panel to conventional weight units for digital read out.

VERTICAL LOCKING SYSTEM

FIG. 6 shows a cross sectional view of the vertical locking device 60 which is composed of a rectangular structural steel member called a spud 61 which slides vertically within another rectangular structural steel member called a spud well 260. Four such spuds 61(a), 61(b), 61(c), and 61(d) provide the appropriate locking support for concrete load. The tolerances of outside dimensions of spuds and inside dimensions of the spud well should be as small as practical. The movement of sliding is aided by use of a lubricant such as grease which is injected between surfaces by a well known method of grease fittings. Four pins 6(a), 6(b), 6(c), and 6(d) may be inserted through predetermined aligned holes in the spud 61(a), 61(b), 61(c), and 61(d)B and spud well 260(a), 260(b), 260(c), and 260(d). respectively, so that when pressure is released on hydraulic cylinders 40 and the pins are inserted (See FIGS. 1 and 6), the force of the load resting on the lifting beam will be transmitted through spuds 61A,B,C,D (FIG. 6) to pins 6A,B,C,D then to spud wells 260(a), 260(b), 260(c), and 260(d) which in turn transmits the pressure to the chassis 20A. Thus the supporting load is mechanically locked in place and does not rest on the pressurized fluid in the hydraulic cylinders during transport.

FIG. 7 shows the mounting bracket for inserting a pin into one of the vertical locking beams to support the load during transit. Also shown are the electromagnetic microswitches which signal the computer controller that the spud pin 6 has been inserted into the beam of the vertical locking system 60.

SEQUENCE OF OPERATION

The essential operation of the concrete bridge segment transport unit is divided into two phases, namely (1) loading the concrete bridge segment from its manufacturing pallet and (2) unloading the concrete bridge segment at the construction site. Each of these phases may be either implemented automatically through computer control or manually through mechanical operator control.

Figure 9A:
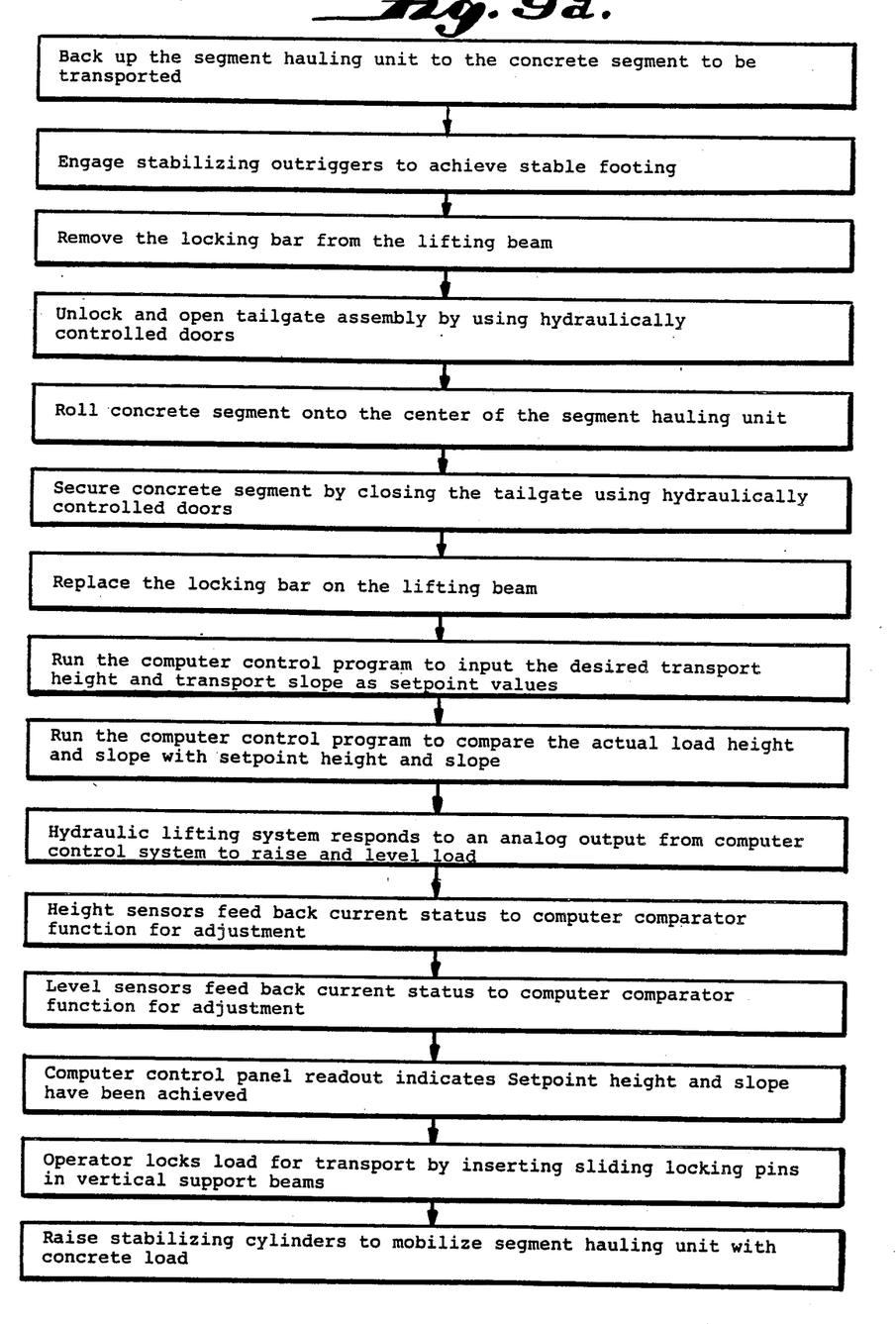
FIG. 9 is a flow chart of the method and steps needed to implement the invention.

I. Loading the Bridge Segment (FIG. 9A)

The operator backs up the prestressed concrete bridge segment hauling unit to the pallet of a bridge segment that is to be transported to the construction site. (step 1) The operator then engages the stabilizing outriggers through the operator control panel to achieve a predetermined elevated level for the tractor bed (step 2). Then the operator mechanically removes the locking bar from the lifting beam (step 3). The operator then mechanically unlocks and opens the tailgate (step 4). The bridge segment is then rolled onto the center of the trailer (step 5). The operator then closes the tailgate and replaces the locking bar in order to give support and strength to the lifting beam assembly (steps 6 and 7). If the loading operation is computer controlled, then the operator may return to the computer control panel to program the loading operation and digitally input the desired height to which the bridge segment is to be raised for transport (step 8). The operator then runs the computer program to compare and adjust the actual height and slope of the load with the setpoint or input height and slope. (step 9) The computer issues a series of dc voltages which are input to the solenoid control to control the hydraulics which will raise the trailer bed and then level it both longitudinally and transversely (step 10). The hydraulic flow of pressurized fluid which is raising the lifting beam is stopped once a sensor controlled feedback loop in the system detects that the appropriate height and planar level have been achieved. These sensors are located at each of the beams. The sensors indicate both the longitudinal level and transverse level as well as the height. The computer program through steps 11 and 12 in FIG. 9A continually checks the beam height and beam level with feed back control over the hydraulics until the desired set point is achieved. When the proper height is detected by the sensor x and the transverse and longitudinal level have been achieved by null or neutral slope, the control panel computer prevents further movement in the hydraulic lifting or movement of the loaded beam. (step 13) The operator then can manually or automatically lock the lifting beam in this raised position through the heavy gauge pins which slide into holes shown in FIG. 6 to lock the beam in place (step 14). The operator then raises the stabilizing cylinders so that the vehicle is mobile and able to transport the engaged bridge segment (step 15).

Figure 9B:
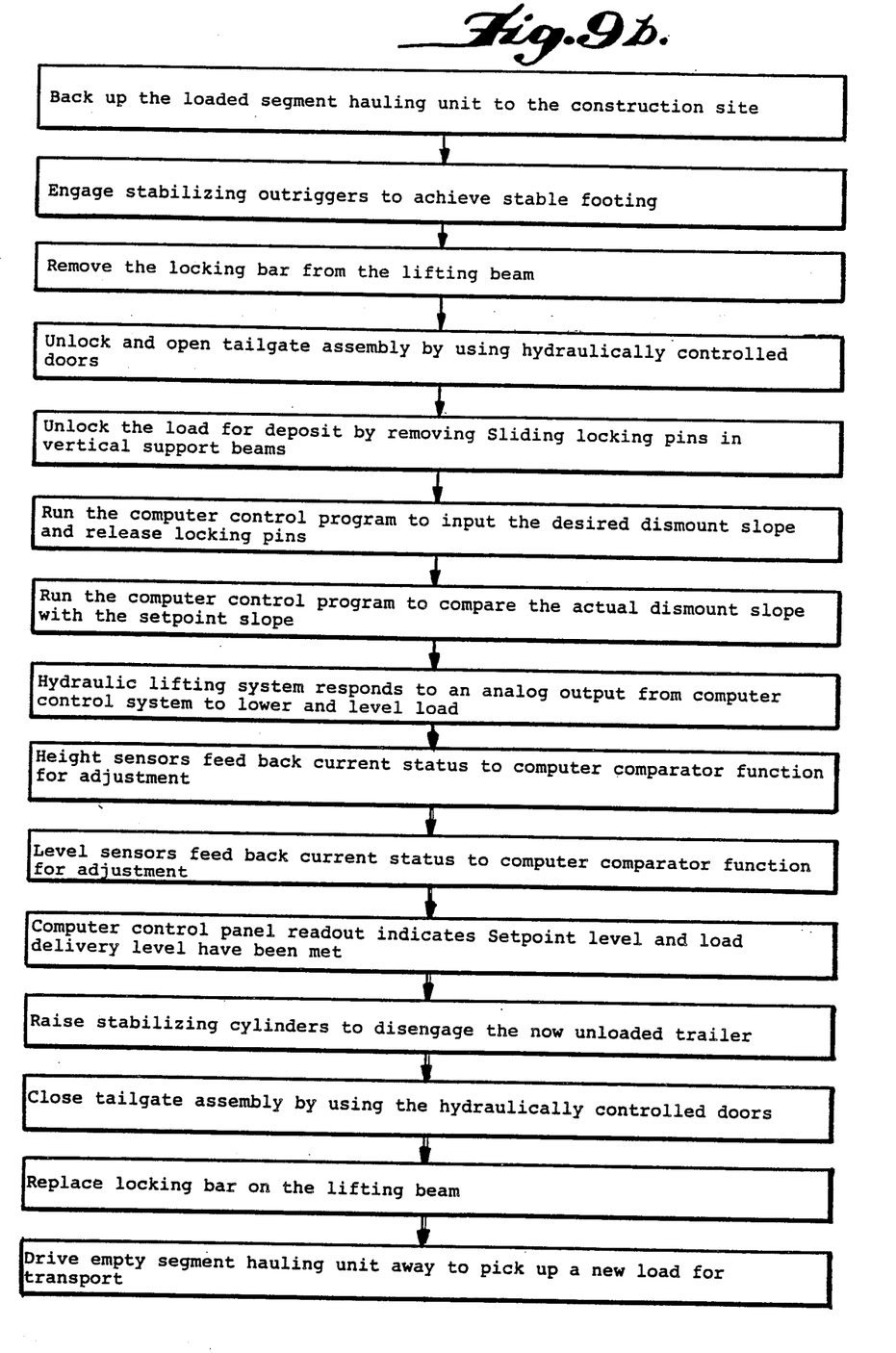

II. Unloading the Bridge Segment (FIG. 9B)

The operator transports the prestressed concrete bridge segment hauling unit (FIG. 1) with on board bridge segment that is to be delivered to the construction site (step 1). The motor of the hydraulic power unit (90) is then started by the operator. Now hydraulic levers 120, 130 are actuated to cause stabilizing cylinders 80, 80A to engage the ground and thus provide a more stable footing. (step 2) The operator removes the locking bar from the lifting beam and opens the tailgate using the hydraulic release (steps 3 and 4) The operator then unlocks the bridge segment for deposit by removing the sliding locking pins in the vertical support beams (step 5) If the unloading operation is computer controlled, then the operator may return to the control panel to program the unloading operation and digitally select the unloading parameters. (step 6) The operator then runs the computer program in order to compare and adjust the actual dismount slope of the segment with the setpoint slope. (step 7) The computer issues a series of dc voltages which are input to the solenoid control to control the hydraulic cylinders which lower the trailer bed as well as level it both transversely and horizontally (step 8). The hydraulic flow of pressurized fluid which is lowering the lifting beam is stopped once a sensor controlled feed back loop in the system detects that the appropriate height and planar level have been achieved. These sensors are located at each end of the beams. The sensors indicate both the longitudinal level and transverse level as well as height. (steps 9 and 10) When the desired height and level are achieved the program automatically actuates a valve which holds the load in place while stationary support is provided to disengage the load on the construction site (step 11) Then the operator raises the stabilizing cylinders to disengage the now unloaded trailer. (step 12) The operator should then close the tailgate and replace the locking bar before driving the trailer away to pick up another load. (steps 13, 14, and 15)

While a preferred embodiment of the invention has been illustrated in detail as the best mode for practicing the invention to illustrate the broader concepts of the present invention as well as the desirable specific details, further embodiments, variations, and modifications are contemplated all within the scope and spirit of the present invention as defined by the following claims.

What is claimed is:

1. A computer automated vehicle with hydraulic control for transporting concrete segments, comprising of:

a rigid U-shaped chassis;

a plurality of wheels mounted on said U-shape chassis to support said chassis above a roadway at a clearance height for rolling movement in a travel direction;

said U-shaped chassis being elongated and including an open end and in the travel direction a closed end, and two longitudinal lattice frames therebetween for defining a right and left side of said chassis, at least two movable beams attached to a top portion of said lattice frames to lift, support, and lower said precast concrete segments;

a hydraulic lifting system including a series of hydraulic cylinders imbedded vertically in both the right longitudinal lattice frame and left longitudinal lattice frame which cylinders when extended apply a lifting force to said movable beams;

a vertical locking system including a series of intersliding rectangular steel beams which extend and lock vertically to stabilize and secure said movable beam at a transport height;

a tailgate assembly mounted at said open end of said chassis, said assembly including at least two steel doors rotatably connected to said right and left lattice frames respectively, said doors open and close and lock through hydraulic control in order to secure both said right and left longitudinal lattice frames and said movable beams holding said concrete segments for transport, and means for fixedly locking said doors closed;

angular lattice bracing members connected to and protruding outwardly from both sides of said longitudinal lattice frames for reinforcing said chassis to counteract lateral movement of said wheels when rolling in said travel direction; and a computer system mounted near said closed end of said chassis to control and monitor lifting, supporting, and lowering of said precast concrete segments, said computer system including a microprocessor controlled analog/digital input and digital/analog output to control said hydraulic lifting system, said vertical locking system, and said tailgate assembly in order to automatically load, secure for transport, and unload said concrete segments.

2. The computer automated vehicle of claim 1, wherein said chassis includes a motor which generates power to run a pump unit to pressurize said hydraulic cylinders to raise and lower said concrete segments and to lock said tailgate.

3. The computer automated vehicle of claim 1, wherein said chassis further includes hydraulic stabilizing cylinders to make stationary the chassis for loading and unloading said concrete segments.

4. The computer automated vehicle of claim 1, wherein said tailgate assembly includes a hydraulic cylinder controlled by a feedback loop from said computer system for forcing said tailgate doors to close through hydraulic pressure.

5. The computer automated vehicle of claim 1, wherein said hydraulic lifting system includes a hydraulic fluid reservoir with attached hydaulic pump for distributing hydraulic fluid throughout said hydraulic lifting system.

6. The computer automated system of claim 5, wherein said hydraulic cylinders operate through solenoid valve control which permits the hydraulic fluid to actuate said hydraulic cylinders to move said movable beam.

7. The computer automated vehicle of claim 6, wherein said hydraulic lifting system contains pizo-electric load cells at the base of said cylinders for measuring the weight of said concrete segments.

8. The computer automated vehicle of claim 6, wherein said hydraulic lifting system has a bar code shaft and linear reader attached to said movable beam for measuring the height of said lifting beam loaded with said concrete segment.

9. The computer automated vehicle of claim 6, wherein said hydraulic lifting system has a fluidized pendulum for measuring slope differential to keep level said movable beam when loaded with said concrete segments.

10. The computer automated vehicle of claim 1, wherein said vertical locking system contains pins to lock and secure said movable beam, said pins inserted pneumatically into aligned holes in said intersliding steel beams by air powered actuating cylinders so that said movable beam is secured at said transport height.

11. The computer automated vehicle of claim 1, wherein said computer system includes I/O interface which receives as input and transmits as output slope, height, and weight measurements as analog signals.

12. The computer automated vehicle of claim 11, wherein said I/O interface converts said slope, height, and weight measurements from said analog signals to input digital signals.

13. The computer automated vehicle of claim 12, wherein said computer system includes a microprocessor for comparing said input digital signals which represent slope and height measurements with pre-selected slope and height values as input from an operator control panel and for storing a resultant value in a read/write memory.

14. The computer automated vehicle of claim 13, wherein said computer system addresses said read/write memory to access said resultant value to calculate new correcting slope and height values.

15. The computer automated vehicle of claim 14, wherein said I/O interface converts correcting said output slope and height values from digital to analog signals.

16. The computer automated vehicle of claim 15, wherein said analog signals representing correcting output slope and height values control said air and hydraulic solenoids.

17. A vehicle with hydraulic control for transporting concrete segments, comprising of:

a rigid U-shaped chassis;

a plurality of wheels mounted on said U-shaped chassis to support said chassis above a roadway at a clearance height for rolling movement in a travel direction;

said U-shaped chassis being elongated and including an open end and in the travel direction a closed end, and two longitudinal lattice frames therebetween for defining a right and left side of said chassis, at least two movable beams attached to a top portion of said lattice frames to lift, support, and lower said precast concrete segments;

a hydraulic lifting system including a series of hydraulic cylinders imbedded vertically in both the right longitudinal lattice frame and left longitudinal lattice frame which cylinders when extended apply a lifting force to said movable beams;

a vertical locking system including a series of intersliding rectangular steel beams which extend and lock vertically to stabilize and secure said movable beam at a transport height;

a tailgate assembly mounted at said open end of said chassis, said assembly including at least two steel doors rotatably connected to said right and left lattice frames respectively, said doors open and close and lock through hydraulic control in order to secure both said right and left longitudinal lattice frames and said movable beams holding said concrete segments for transport, and means for fixedly locking said doors closed; and angular lattice bracing members connected to and protruding outwardly from both sides of said longitudinal lattice frames for reinforcing said chassis to counteract lateral movement of said wheels when rolling in said travel direction.

18. The vehicle of claim 17, wherein said chassis includes a motor which generates power to run a pump unit to pressurize said hydraulic cylinders to raise and lower said concrete segments and to lock said tailgate.

19. The vehicle of claim 17, wherein said chassis further includes hydraulic stabilizing cylinders to make stationary the chassis for loading and unloading said concrete segments.

20. The vehicle of claim 17, wherein said tailgate assembly includes a hydraulic cylinder for forcing said tailgate doors to close through hydraulic pressure.

21. The vehicle of claim 17, wherein said hydraulic lifting system includes a hydraulic fluid reservoir with attached hydraulic pump for distributing hydraulic fluid throughout said hydraulic lifting system.

22. The system of claim 21, wherein said hydraulic cylinders operate through solenoid valve control which permits the hydraulic fluid to actuate said hydraulic cylinders to move said movable beam.

23. The vehicle of claim 22, wherein said hydraulic lifting system contains pizo-electric load cells at the base of said cylinders for measuring the weight of said concrete segments.

24. The vehicle of claim 22, wherein said hydraulic lifting system has a bar code shaft and linear reader attached to said movable beam for measuring the transport height of said movable beam loaded with said concrete segments.

25. The vehicle of claim 22, wherein said hydraulic lifting system has a fluidized pendulum for measuring slope differential to keep level said movable beam when loaded with said concrete segments.

26. The vehicle of claim 17, wherein said vertical locking system contains pins to lock and secure said movable beam said pins inserted pneumatically into aligned holes in said intersliding steel beams by air powered actuating cylinders so that said movable beam is secured at said transport height.

* * * * *